US012801715B2

(12) United States Patent
Hu et al.

(10) Patent No.: US 12,801,715 B2
(45) Date of Patent: Nov. 17, 2026

(54) INDIVIDUAL SEAL MANAGEMENT TERMINAL DEVICE AND INDIVIDUAL SEAL MANAGEMENT METHOD

(71) Applicant: Jinqian Hu, Hangzhou (CN)

(72) Inventors: Jinqian Hu, Hangzhou (CN); Ai Guo, Hangzhou (CN); Xinyi Cai, Hangzhou (CN)

(73) Assignee: Jinqian Hu, Hangzhou (CN)

( * ) Notice: Subject to any disclaimer, the term of this patent is extended or adjusted under 35 U.S.C. 154(b) by 128 days.

(21) Appl. No.: 18/974,676

(22) Filed: Dec. 9, 2024

(65) Prior Publication Data

US 2025/0190533 A1 Jun. 12, 2025

(30) Foreign Application Priority Data

Dec. 11, 2023 (CN) ......................... 202311695730.3

(51) Int. Cl.
*G06F 21/33* (2013.01)
*G06F 21/32* (2013.01)
(Continued)

(52) U.S. Cl.
CPC .............. *G06F 21/33* (2013.01); *G06F 21/32* (2013.01); *G06F 21/602* (2013.01); *G06F 21/6209* (2013.01)

(58) Field of Classification Search
None
See application file for complete search history.

(56) References Cited

U.S. PATENT DOCUMENTS 12,711,328 B2 * 8/2026 Rathnam ................. G06F 40/58
2007/0181736 A1 * 8/2007 Shaikh ................... G06Q 10/10 242/559

(Continued)

OTHER PUBLICATIONS

Lins, et al., A Design Theory for Certification Presentations, The Data Base for Advances in Information Systems, vol. 54, No. 3, Aug. 2023, pp. 76-118. (Year: 2023).*

(Continued)

*Primary Examiner* — Luu T Pham
*Assistant Examiner* — Edward X Long
(74) *Attorney, Agent, or Firm* — Yuhao Liang

(57) ABSTRACT

The present invention discloses an individual seal management terminal device, including: a first information acquisition module configured to acquire multiple user identity information; a second information acquisition module configured to acquire user name information and generate multiple individual personal seal information and multiple corresponding individual personal seal serial numbers; a first authentication module configured to generate multiple authenticated identity information; a second authentication module configured to generate multiple authenticated individual personal seal information; an individual seal generation module configured to generate multiple individual personal seals according to the multiple authenticated identity information and the multiple authenticated individual personal seal information; an integrated seal generation module configured to integrate and bind the multiple individual personal seals of the user and the multiple corresponding individual personal seal serial numbers to generate an integrated personal seal; and an authorization module configured to allow the user to call the integrated personal seal after authorization.

8 Claims, 12 Drawing Sheets

(51) Int. Cl.
*G06F 21/60* (2013.01)
*G06F 21/62* (2013.01)

(56) References Cited

U.S. PATENT DOCUMENTS

| | | | | |
|---|---|---|---|---|
| 2019/0034418 | A1* | 1/2019 | Kubo | G06F 40/58 |
| 2019/0205547 | A1* | 7/2019 | Horvath | G06Q 20/3674 |
| 2020/0135177 | A1* | 4/2020 | Li | G06F 40/20 |
| 2023/0300129 | A1* | 9/2023 | Hojjati | H04L 63/166<br>726/4 |
| 2024/0256687 | A1* | 8/2024 | Bidkar | G06F 21/6245 |

OTHER PUBLICATIONS

Hunt et al., Theorical Analysis of using Identity Based PKI as the Authentication method in SQL, Information Security Curriculum Development Conference 2013, Oct. 12, 2013, pp. 33-41. (Year: 2013).*

* cited by examiner

INDIVIDUAL SEAL MANAGEMENT TERMINAL DEVICE AND INDIVIDUAL SEAL MANAGEMENT METHOD

CROSS-REFERENCE TO RELATED APPLICATION

This application claims priority of Chinese Patent Application No. 202311695730.3, filed on Dec. 11, 2023, the entire contents of which are incorporated herein by reference.

FIELD OF THE INVENTION

The present invention relates to the technical field of information security, and specifically relates to a seal management terminal device and a seal management method.

BACKGROUND OF THE INVENTION

Both individual and corporate often need to manage different private seals, official seals and various seals, and also need to deal with tax returns, contracts, bills and other affairs, and the process is very cumbersome. Therefore, it is urgent for those skilled in the art to develop digital certificate-union credit seal grid management system based on the application of electronic seals, to solve the problems of corporates and governments in the management and application of various electronic seals, and meet the actual needs of individuals and corporates in daily government applications.

It is to be noted that the above introduction of the technical background is only for the purpose of facilitating a clear and complete explanation of the technical solution of the present invention and facilitating the understanding of those skilled in the art. These solutions should not be considered to be known to those skilled in the art simply because they are described in the background art of the present invention.

SUMMARY OF THE INVENTION

In order to overcome the defects in the prior art, the embodiments of the present invention provide an individual seal management terminal device and an individual seal management method.

The embodiments of the present invention discloses an individual seal management terminal device, comprising: a first information acquisition module, configured to acquire multiple user identity information; a second information acquisition module, configured to acquire user name information, and generate multiple individual personal seal information and multiple corresponding individual personal seal serial numbers; a first authentication module which is coupled to the first information acquisition module and configured to carry out entity or digital authentication on the multiple identity information so as to generate multiple authenticated identity information; a second authentication module which is coupled to the second information acquisition module and configured to carry out entity or digital authentication on the multiple individual personal seal information so as to generate multiple authenticated individual personal seal information; an individual seal generation module which is coupled to the first authentication module and the second authentication module and configured to generate multiple individual personal seals according to the multiple authenticated identity information and the multiple authenticated individual personal seal information; an integrated seal generation module which is coupled to the individual seal generation module and configured to integrate and bind the multiple individual personal seals of the user and the multiple corresponding individual personal seal serial numbers so as to generate an integrated personal seal; and an authorization module which is coupled to the integrated seal generation module and configured to allow the user to call the integrated personal seal after authorization.

Further, the first information acquisition module is also configured to obtain multiple corporate information of the user; the second information acquisition module is also configured to obtain corporate name information of the user and generate multiple individual corporate seal information and multiple corresponding individual corporate seal serial numbers; the first authentication module is also configured to carry out entity or digital authentication on the multiple corporate information so as to generate multiple authenticated corporate information; the second authentication module is also configured to carry out entity or digital authentication on the multiple individual corporate seal information so as to generate multiple authenticated individual corporate seal information; the individual seal generation module is also configured to generate multiple individual corporate seals according to the multiple authenticated identity information and the multiple authenticated individual corporate seal information; the integrated seal generation module is also configured to integrate and bind the multiple individual corporate seals of the user and the multiple corresponding individual corporate seal serial numbers so as to generate an integrated corporate seal; and the authorization module is also configured to allow the user to call the integrated corporate seal after authorization.

Further, the first authentication module is also connected to multiple first certificate issuing authorities, and configured to obtain multiple first CA certificates provided by the multiple first certificate issuing authorities and multiple corresponding first keys, and carry out entity or digital authentication on the multiple identity information and/or multiple corporate information according to the multiple first CA certificates, so as to generate the multiple authenticated identity information and the multiple authenticated corporate information; and the second authentication module is also connected to multiple second certificate issuing authorities, and configured to obtain multiple second CA certificates provided by the multiple second certificate issuing authorities and multiple corresponding second keys, and carry out entity or digital authentication on the multiple individual personal seal information and/or the multiple individual corporate seal information according to the multiple second CA certificates, so as to generate the multiple authenticated individual personal seal information and the multiple authenticated individual corporate seal information.

Further, the multiple individual personal seal information is subjected to entity or digital authentication by adopting the second CA certificates provided by different second certificate issuing authorities respectively; and the multiple individual corporate seal information is subjected to entity or digital authentication by adopting the second CA certificates provided by different second certificate issuing authorities respectively.

Further, the individual seal generation module is also connected to multiple seal production company servers, and configured to generate the multiple individual personal seals and/or the multiple individual corporate seals through the multiple seal production company servers; and the integrated seal generation module is also connected to the multiple seal production company servers, and configured to integrate and bind the multiple individual personal seals of the user with the multiple corresponding individual personal seal serial numbers through the multiple seal production company servers so as to generate the integrated personal seal, and integrate and bind the multiple individual corporate seals of the user with the multiple corresponding individual corporate seal serial numbers through the multiple seal production company servers so as to generate the integrated corporate seal.

Further, the multiple individual personal seals are generated by different seal production company servers respectively; and the multiple individual corporate seals are generated by different seal production company servers respectively.

Further, the individual seal management terminal device further comprises: a language transformation module which is configured to transform the multiple individual personal seal information and/or the multiple individual corporate seal information from a first language to a second language, and generate multiple translated individual personal seal information and/or multiple translated individual corporate seal information; the second authentication module is also configured to carry out entity or digital authentication on the multiple translated individual personal seal information and/or the multiple translated individual corporate seal information so as to generate multiple authenticated translated individual personal seal information and/or multiple authenticated translated individual corporate seal information; the individual seal generation module is also configured to generate multiple translated individual personal seals according to the multiple authenticated identity information and the multiple authenticated translated individual personal seal information, and generate multiple translated individual corporate seals according to the multiple authenticated identity information and the multiple authenticated translated individual corporate seal information; and the integrated seal generation module is also configured to integrate and bind the multiple translated individual personal seals of the user and the multiple corresponding individual personal seal serial numbers to generate a translated integrated personal seal, and integrate and bind the multiple translated individual corporate seals of the user and the multiple corresponding individual corporate seal serial numbers to generate a translated integrated corporate seal.

Further, the name information comprises simplified Chinese, traditional Chinese, English, French, German, Russian or other languages; and the corporate name information comprises simplified Chinese, traditional Chinese, English, French, German, Russian or other languages.

Further, the multiple individual personal seal information comprises at least two or more individual personal seal information, and the multiple corresponding individual personal seal serial numbers are ascended according to an input sequence of the name information; and the multiple individual corporate seal information comprises at least two or more individual corporate seal information, and the multiple corresponding individual corporate seal serial numbers are ascended according to the input sequence of the corporate name information.

Further, the individual seal management terminal device further comprises a multi-module, the multi-module comprises: a central control module, a communication module, an identity authentication module, a key module and a storage module, wherein the communication module, the identity authentication module, the key module and the storage module are connected to the central control module; the communication module is configured to implement communication between the individual seal management terminal device and an external server; the identity authentication module is configured to authenticate biometric data inputted by the user to generate authenticated biometric data and authorize the user after authentication; the key module is configured to store the multiple keys and encrypt the multiple authenticated identity information, the multiple authenticated corporate information, the multiple authenticated individual personal seal information and the multiple authenticated individual corporate seal information according to the corresponding keys in the multiple keys, so as to generate multiple encrypted authenticated identity information, multiple encrypted authenticated corporate information, multiple encrypted authenticated individual personal seal information and multiple encrypted authenticated individual corporate seal information; the storage module is configured to store the authenticated biometric data, the multiple encrypted authenticated identity information, the multiple encrypted authenticated corporate information, the multiple encrypted authenticated individual personal seal information, the multiple encrypted authenticated individual corporate seal information, the multiple individual personal seals, the integrated personal seal, the multiple individual corporate seals and the integrated corporate seal; and the central control module is configured to receive input and control operation of other modules, and allow the user to call the integrated personal seal and the integrated corporate seal after authorization.

The embodiments of the present invention also discloses an individual seal management method, comprising the followings steps:

- providing the individual seal management terminal device, wherein the individual seal management terminal device comprises a first information acquisition module, a second information acquisition module, a first authentication module, a second authentication module, an individual seal generation module, an integrated seal generation module, and an authorization module.

Further, acquiring multiple user identity information through the first information acquisition module; acquiring user name information through the second information acquisition module, and generating multiple individual personal seal information and multiple corresponding individual personal seal serial numbers; carrying out entity or digital authentication on the multiple identity information through the first authentication module to generate multiple authenticated identity information; carrying out entity or digital authentication on the multiple individual personal seal information through the second authentication module to generate multiple authenticated individual personal seal information; generating multiple individual personal seals through the individual seal generation module according to the multiple authenticated identity information and the multiple authenticated individual personal seal information; integrating and binding the multiple individual personal seals of the user and the multiple corresponding individual personal seal serial numbers through the integrated seal generation module to generate an integrated personal seal; and allowing the user to call the integrated personal seal after authorization through the authorization module.

By means of the above technical solutions, the present invention has the following beneficial effects: compared with the prior art, according to the individual seal management terminal device and the individual seal management method provided by the present invention, the name information is split into the multiple individual personal seal information, the CA certificates provided by different certificate issuing authorities are adopted for entity or digital authentication, and each individual personal seal is generated by different seal production company servers; the present invention can be further applied to corporate name information, the corporate name information is split into the multiple individual corporate seal information, the CA certificates provided by different certificate issuing authorities are adopted for entity or digital authentication, and each individual corporate seal is generated by different seal production company servers. In addition, according to the present invention, the name information and the corporate name information can be simplified Chinese, traditional Chinese, English, French, German, Russian or other languages, and Chinese can be transformed into English, French, German, Russian or other languages through a translation platform, and vice versa. Thus, the security can be greatly improved through multi-element and multi-platform verification according to the present invention.

In general, the individual seal management terminal device and the individual seal management method provided by the present invention have the following characteristics and beneficial effects:

1, each character in the name information and corporate name information is subjected to separate authentication and separate signing;

2, each character in the name information and the corporate name information is subjected to authentication authorization, cloud signing and common signing and management on different platforms;

3, Chinese names, English names, French names, German names, Russian names or other language names all can be subjected to authorization authentication in all countries with CA authentication authorities in the world;

4, The personal seal is bound with email, the email needs to be activated, a linked email platform is searched for in the email, and the email platform corresponds to an electronic seal system all over the world, so the security is high; and 5, different types of files in different forms can be stored by the formatted email, such as contracts, invoices, videos, photos and other types.

Figure 1:
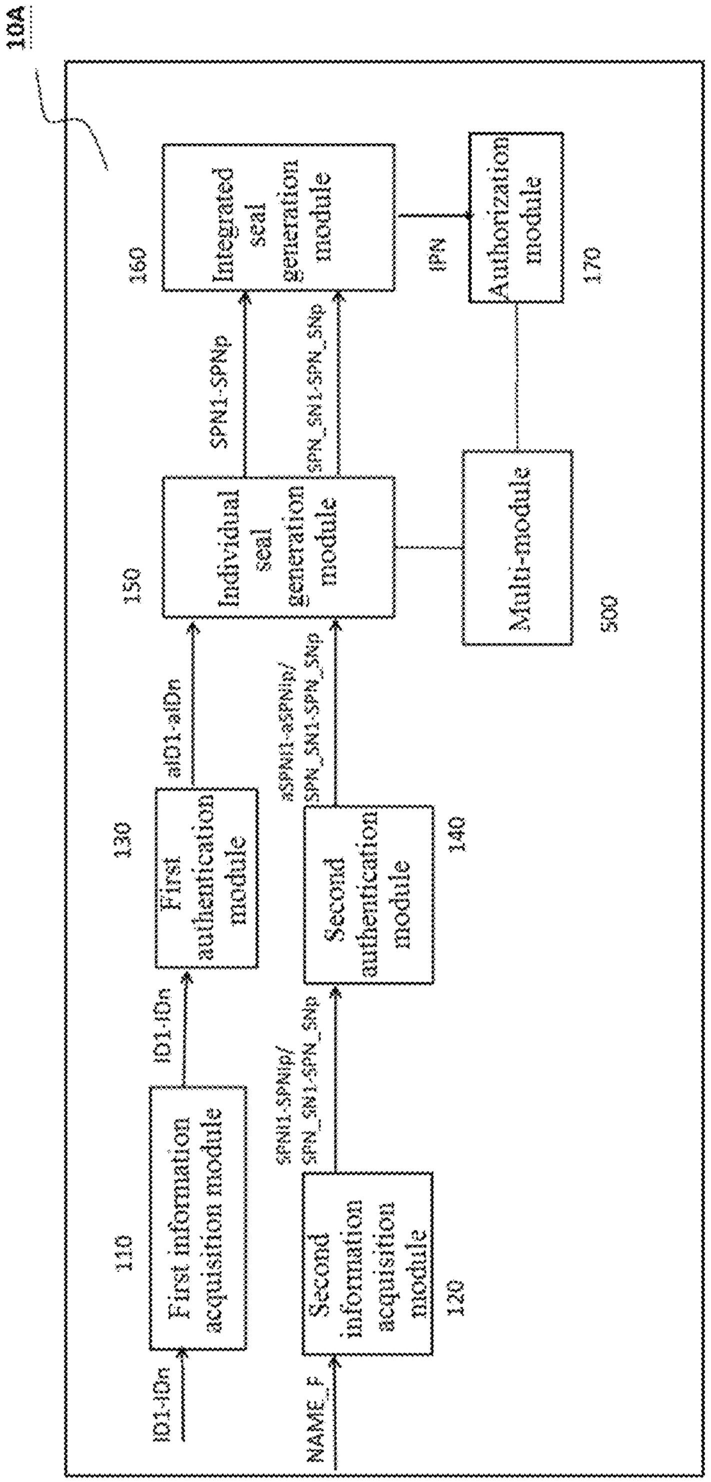
FIG. 1 is a framework diagram of an individual seal management terminal device in an Embodiment 1 of the present invention.

Reference numerals in the above figures are as follows:

10A, 10B and 10C—individual seal management terminal device; 110—first information acquisition module; 120—second information acquisition module; 130—first authentication module; 140—second authentication module; 150—individual seal generation module; 160—integrated seal generation module; 170—authorization module; 180—language transformation module; 500—multi-module; 510—central control module; 520—communication module; 530—identity authentication module; 540—key module; 550—storage module; NAME_P—name information; ID1-IDn—identity information; aID1-aIDn, authenticated identity information; eaID1-eaIDn, encrypted authenticated identity information; SPNI1-SPNIp, individual personal seal information; aSPNI1-aSPNIp, authenticated individual personal seal information; eaSPNI1-eaSPNIp, encrypted authenticated individual personal seal information; tSPNI1-tSPNIp, translated individual personal seal information; atSPNI1-atSPNIp, authenticated translated individual personal seal information; eatSPNI1-eatSPNIp, encrypted authenticated translated individual personal seal information; SPN_SN1-SPN_SNp, individual personal seal serial number; SPN1-SPNp, individual personal seal; tSPN1-tSPNp, translated individual personal seal; IPN, integrated personal seal; tIPN, translated integrated personal seal; NAME_C, corporate name information; CI1-CIm, corporate information; aCI1-aCIm, authenticated corporate information; eaCI1-eaCIm, encrypted authenticated corporate information; SCNI1-SCNIq, individual corporate seal information; aSCNI1-aSCNIq, authenticated individual corporate seal information; eaSCNI1-eaSCNIq, encrypted authenticated individual corporate seal information; tSCNI1-tSCNIq, translated individual corporate seal information; atSCNI1-atSCNIq, authenticated translated individual corporate seal information; eaSCNI1-eaSCNIq, encrypted authenticated individual corporate seal information; SCN_SN1-SCN_SNq, individual corporate seal serial number; SCN1-SCNq, individual corporate seal; tSCN1-tSCNq, translated individual corporate seal; ICN, integrated corporate seal; tICN, translated integrated corporate seal; BID, biometric data; aBID, authenticated biometric data; and KEY1-KEYt, key; and S610-S680, S710-S770, and S810-S860—steps.

DETAILED DESCRIPTION OF SOME EMBODIMENTS

In order to make the above and other objective, features and advantages of the present invention more obvious and easy to understand, preferred embodiments are listed below and described in detail as follows in cooperation with accompanying drawings.

To describe the embodiments of the present invention or the technical solutions in the prior art more clearly, the following briefly introduces the accompanying drawings required for describing the embodiments or the descriptions in the prior art. Apparently, the accompanying drawings in the following description show merely some embodiments of the present invention, and a person of ordinary skill in the art may still derive other drawings from these accompanying drawings without creative efforts.

The technical solutions in the embodiments of the present invention will be clearly and completely described as follows in combination with the drawings in the examples of the present invention, but obviously, the described examples are only a part of the embodiments of the present invention, rather than all the embodiments. Based on the examples of the present invention, all other examples obtained by a person skilled in the art without creative efforts shall fall within the protection scope of the present invention It is to be noted that in the description of the present invention, the terms "first", "second", etc. are only used for describing the objective and distinguish similar objects, and there is no order between the two, nor can they be understood to indicate or imply relative importance. In addition, in the description of the present invention, unless otherwise stated, "multiple" means two or more of them.

With reference to FIG. 1, FIG. 1 is a framework diagram of an individual seal management terminal device 10A in an Embodiment 1 of the present invention. As shown in FIG. 1, the individual seal management terminal device 10A includes a first information acquisition module 110, a second information acquisition module 120, a first authentication module 130, a second authentication module 140, an individual seal generation module 150, an integrated seal generation module 160 and an authorization module 170.

In the embodiment, the first information acquisition module 110 is configured to acquire multiple user identity information ID1-IDn; and the second information acquisition module 120 is configured to acquire user name information NAME_P, and generate multiple individual personal seal information SPNI1-SPNIp and multiple corresponding individual personal seal serial numbers SPN_SN1-SPN_SNp. The first authentication module 130 is coupled to the first information acquisition module 110 and configured to carry out entity or digital authentication on the multiple identity information ID1-IDn to generate multiple authenticated identity information aID1-aIDn; and the second authentication module 140 is coupled to the second information acquisition module 120 and configured to carry out entity or digital authentication on the multiple individual personal seal information SPNI1-SPNIp to generate multiple authenticated individual personal seal information aSPNI1-aSPNIp. The individual seal generation module 150 is coupled to the first authentication module 130 and the second authentication module 140 and configured to generate multiple individual personal seals SPN1-SPNp according to the multiple authenticated identity information aID1-aIDn and the multiple authenticated individual personal seal information aSPNI1-aSPNIp; and the integrated seal generation module 160 is coupled to the individual seal generation module 150 and configured to integrate and bind the multiple individual personal seals SPN1-SPNp of the user and the multiple corresponding individual personal seal serial numbers SPN_SN1-SPN_SNp to generate an integrated personal seal IPN. The authorization module 170 is coupled to the integrated seal generation module 160 and configured to allow the user to call the integrated personal seal IPN after authorization.

It is to be noted that the multiple identity information ID1-IDn may include ID card, address, email, telephone number, Alipay account, QQ account, WeChat account, MicroBlog account, live room ID, TikTok ID and/or video channel of the company founder (i.e., the corporate administrator of the company user), but the present invention is not limited to this.

Figure 2:
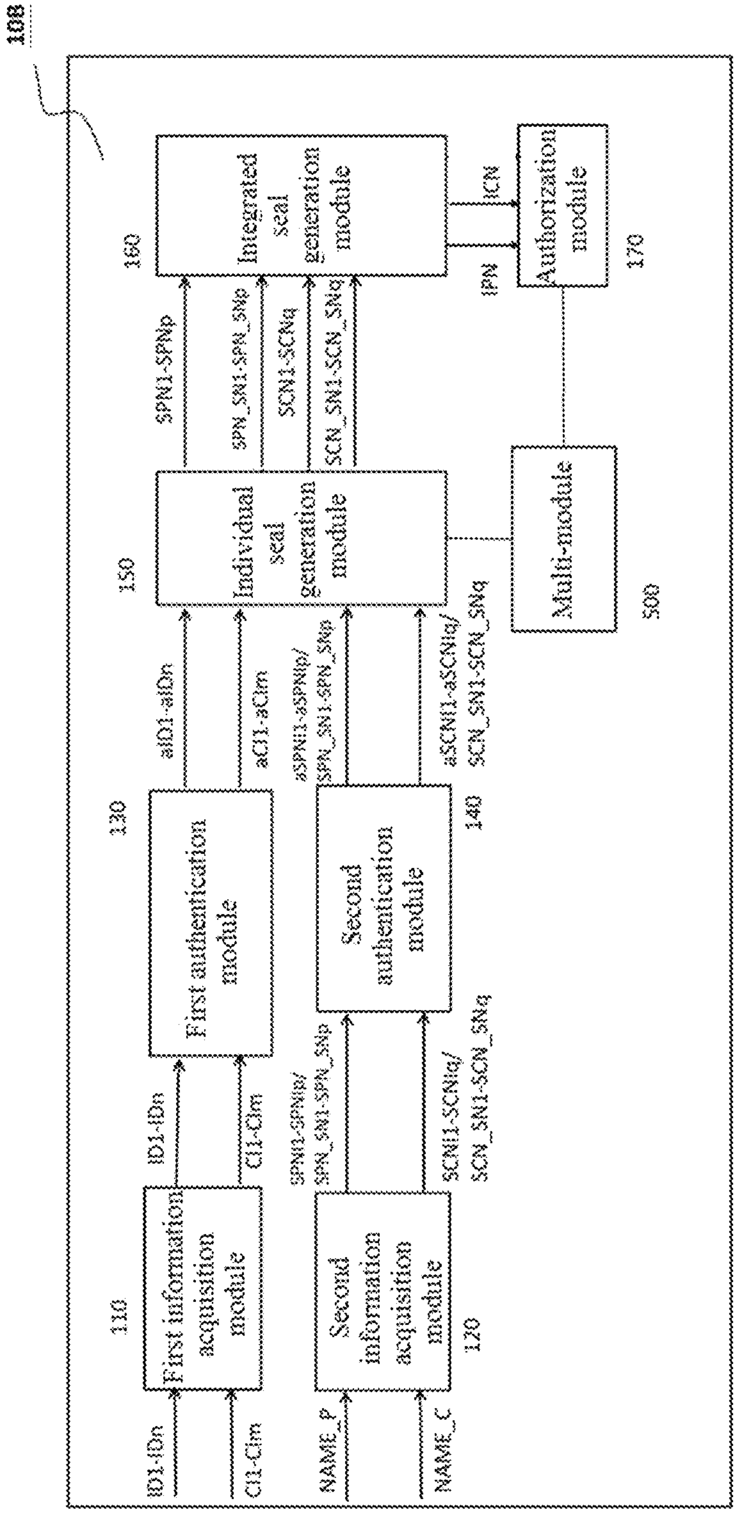
FIG. 2 is a framework diagram of an individual seal management terminal device in an Embodiment 2 of the present invention.

With reference to FIG. 2, FIG. 2 is a framework diagram of an individual seal management terminal device 10B in an Embodiment 2 of the present invention. The individual seal management terminal device 10B in FIG. 2 is similar to the individual seal management terminal device 10A in FIG. 1, and the difference is that the individual seal management terminal device 10B in FIG. 2 can generate the multiple individual personal seals SPN1-SPNp and the integrated individual personal seal IPN, and can further generate multiple individual corporate seals SCN1-SCNq and an integrated corporate seal ICN.

In the embodiment as shown in FIG. 2, the first information acquisition module 110 is also configured to obtain multiple corporate information CI1-CIm of the user; the second information acquisition module 120 is also configured to obtain corporate name information NAME_C of the user, and generate multiple individual corporate seal information SCNI1-SCNIq and multiple corresponding individual corporate seal serial numbers SCN_SN1-SCN_SNq. The first authentication module 130 is also configured to carry out entity or digital authentication on the multiple corporate information CI1-CIm so as to generate multiple authenticated corporate information aCI1-aCIm; and the second authentication module 140 is also configured to carry out entity or digital authentication on the multiple individual corporate seal information SCNI1-SCNIq so as to generate multiple authenticated individual corporate seal information aSCNI1-aSCNIq. The individual seal generation module 150 is also configured to generate multiple individual corporate seals SCN1-SCNq according to the multiple authenticated identity information aID1-aIDn and the multiple authenticated individual corporate seal information aSCNI1-aSCNIq; and the integrated seal generation module is also configured to integrate and bind the multiple individual corporate seals SCN1-SCNq of the user and the multiple corresponding individual corporate seal serial numbers SCN_SN1-SCN_SNq so as to generate the integrated corporate seal ICN. The authorization module 170 is also configured to allow the user to call the integrated corporate seal ICN after authorization.

It is to be noted that the multiple corporate information CI1-CIm may include bound telephone number, bound bank account of authorized users of a bank system and/or government system, electronic trade license, tax control information, official seal number, artificial person certificate number, unified social credit code, electronic license number, address, email, corporate WeChat account and/or live room ID, but the present invention is not limited to this.

Figure 3:
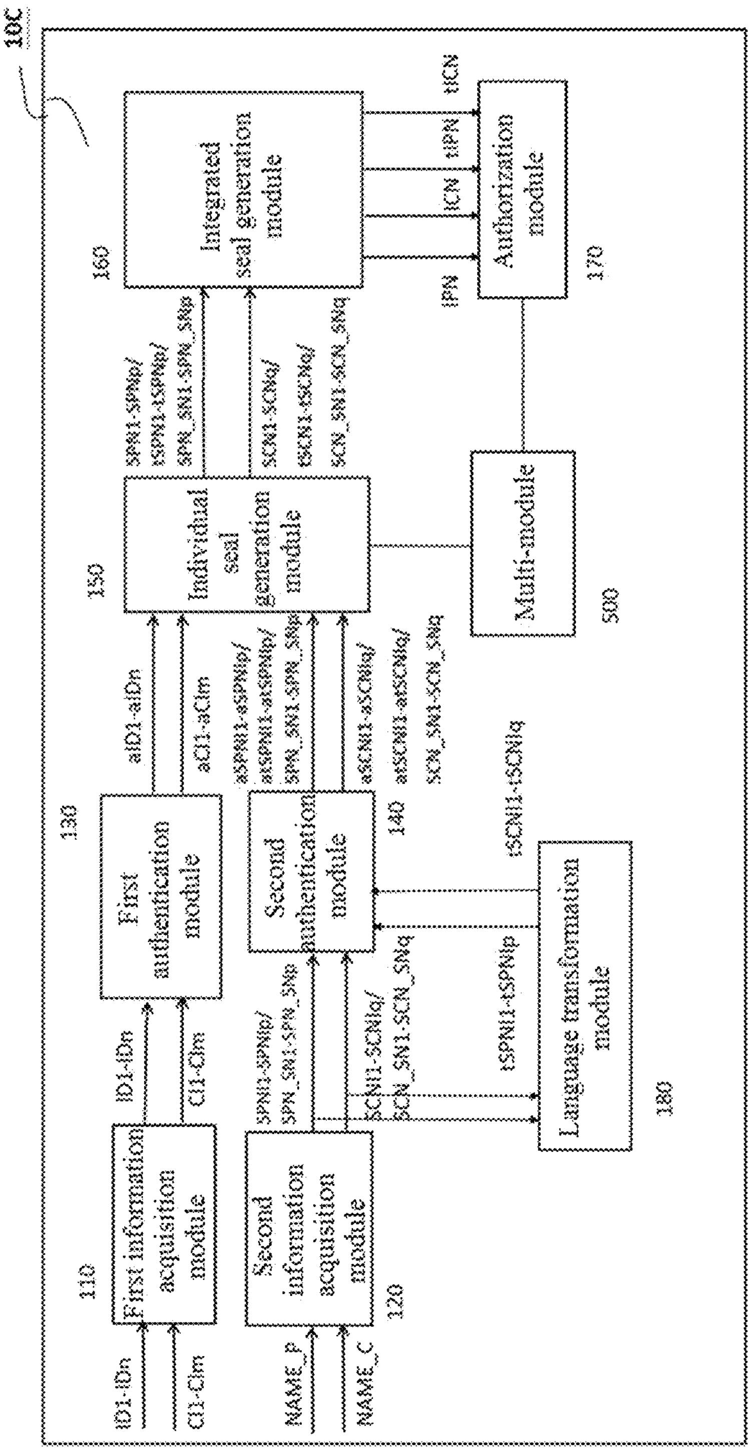
FIG. 3 is a framework diagram of an individual seal management terminal device in an Embodiment 3 of the present invention.

With reference to FIG. 3, FIG. 3 is a framework diagram of an individual seal management terminal device 10C in an Embodiment 3 of the present invention. The individual seal management terminal device 10C in FIG. 3 is similar to the individual seal management terminal device 10B in FIG. 2, and the difference is that the individual seal management terminal device 10C in FIG. 3 further includes a language transformation module 180 which is coupled to the second information acquisition module 120 and the second authentication module 140 and is configured to transform the multiple individual personal seal information SPNI1-SPNIp and/or the multiple individual corporate seal information SCNI1-SCNIq from a first language to a second language, and generate multiple translated individual personal seal information tSPNI1-tSPNIp and/or multiple translated individual corporate seal information tSCNI1-tSCNIq. The second authentication module 140 is also configured to carry out entity or digital authentication on the multiple translated individual personal seal information tSPNI1-tSPNIp and/or the multiple translated individual corporate seal information tSCNI1-tSCNIq to generate multiple authenticated translated individual personal seal information atSPNI1-atSPNIp and/or multiple authenticated translated individual corporate seal information atSCNI1-atSCNIq. Moreover, the individual seal generation module 150 is also configured to generate multiple translated individual personal seals tSPN1-tSPNp according to the multiple authenticated identity information aID1-aIDn and the multiple authenticated translated individual personal seal information atSPNI1-tSPNIp, and generate multiple translated individual corporate seals tSCN1-tSCNq according to the multiple authenticated identity information aID1-aIDn and the multiple authenticated translated individual corporate seal information atSCNI1-atSCNIq. The integrated seal generation module 160 is also configured to integrate and bind the multiple translated individual personal seals tSPN1-tSPNp of the user and the multiple corresponding individual personal seal serial numbers SPN_SN1-SPN_SNp to generate a translated integrated individual seal tIPN, and integrate and bind the multiple translated individual corporate seals tSCN1-tSCNq of the user and the multiple corresponding individual corporate seal serial numbers SCN_SN1-SCN_SNq to generate a translated integrated corporate seal tICN.

In the embodiment, the first authentication module 130 is also connected to multiple first certificate issuing authorities, and configured to obtain multiple first CA certificates provided by the multiple first certificate issuing authorities and multiple corresponding first keys, and carry out entity or digital authentication on the multiple identity information ID1-IDn and/or multiple corporate information CI1-CIm according to the multiple first CA certificates, so as to generate multiple authenticated identity information aID1-aIDn and multiple authenticated corporate information aCI1-aCIm; and the second authentication module 140 is also connected to multiple second certificate issuing authorities, and configured to obtain multiple second CA certificates provided by the multiple second certificate issuing authorities and multiple corresponding second keys, and carry out entity or digital authentication on the multiple individual personal seal information SPNI1-SPNIp and/or the multiple individual corporate seal information SCNI1-SCNIq according to the multiple second CA certificates, so as to generate multiple authenticated individual personal seal information aSPNI1-aSPNIp and multiple authenticated individual corporate seal information aSCNI1-aSCNIq.

In the embodiment, the individual seal generation module 150 is also connected to multiple seal production company servers, and configured to generate the multiple individual personal seals SPN1-SPNp and/or the multiple individual corporate seals SCN1-SCNq through the multiple seal production company servers; and the integrated seal generation module 160 is also connected to the multiple seal production company servers, and configured to integrate and bind the multiple individual personal seals SPN1-SPNp of the user with the multiple corresponding individual personal seal serial numbers SPN_SN1-SPN_SNp through the multiple seal production company servers so as to generate the integrated personal seal IPN, and integrate and bind the multiple individual corporate seals SCN1-SCNq of the user with the multiple corresponding individual corporate seal serial numbers SCN_SN1-SCN_SNq through the multiple seal production company servers so as to generate the integrated corporate seal ICN.

Figure 6:
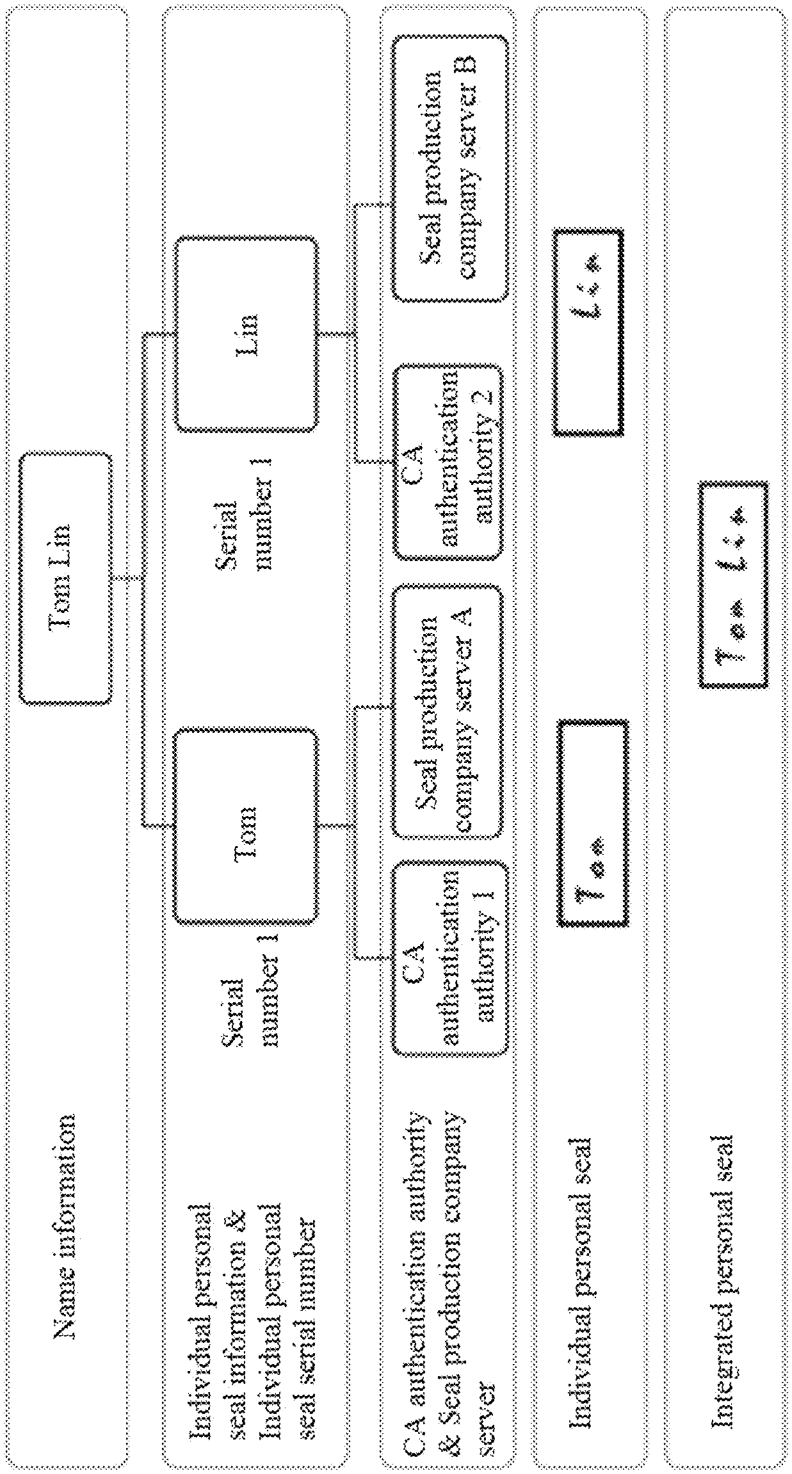
FIG. 6 is a schematic diagram of an embodiment of generating multiple individual personal seals and generating an integrated personal seal according to the present invention.
Figure 7:
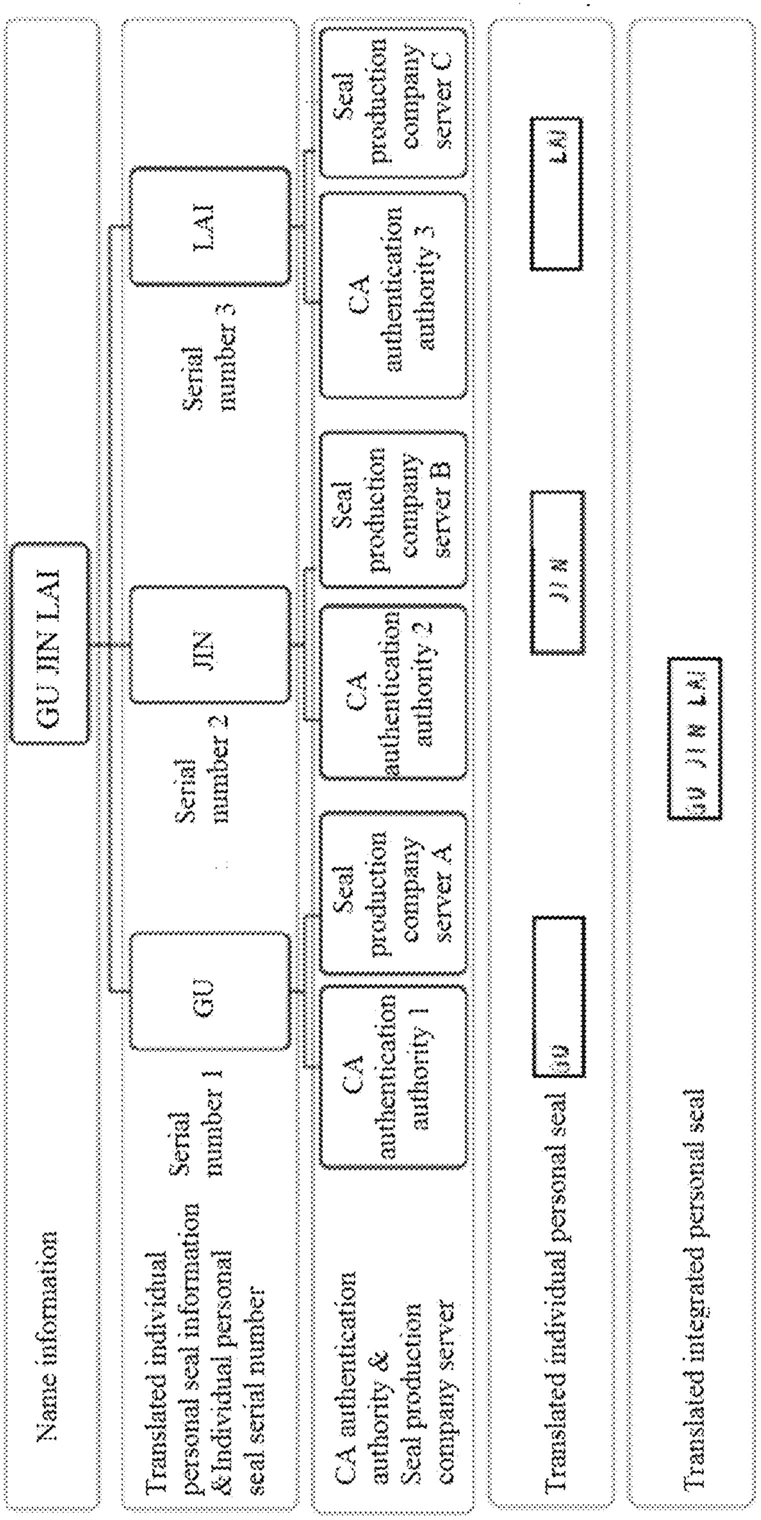
FIG. 7 is a schematic diagram of an embodiment of generating multiple individual personal seals and generating an integrated personal seal according to the present invention.
Figure 8:
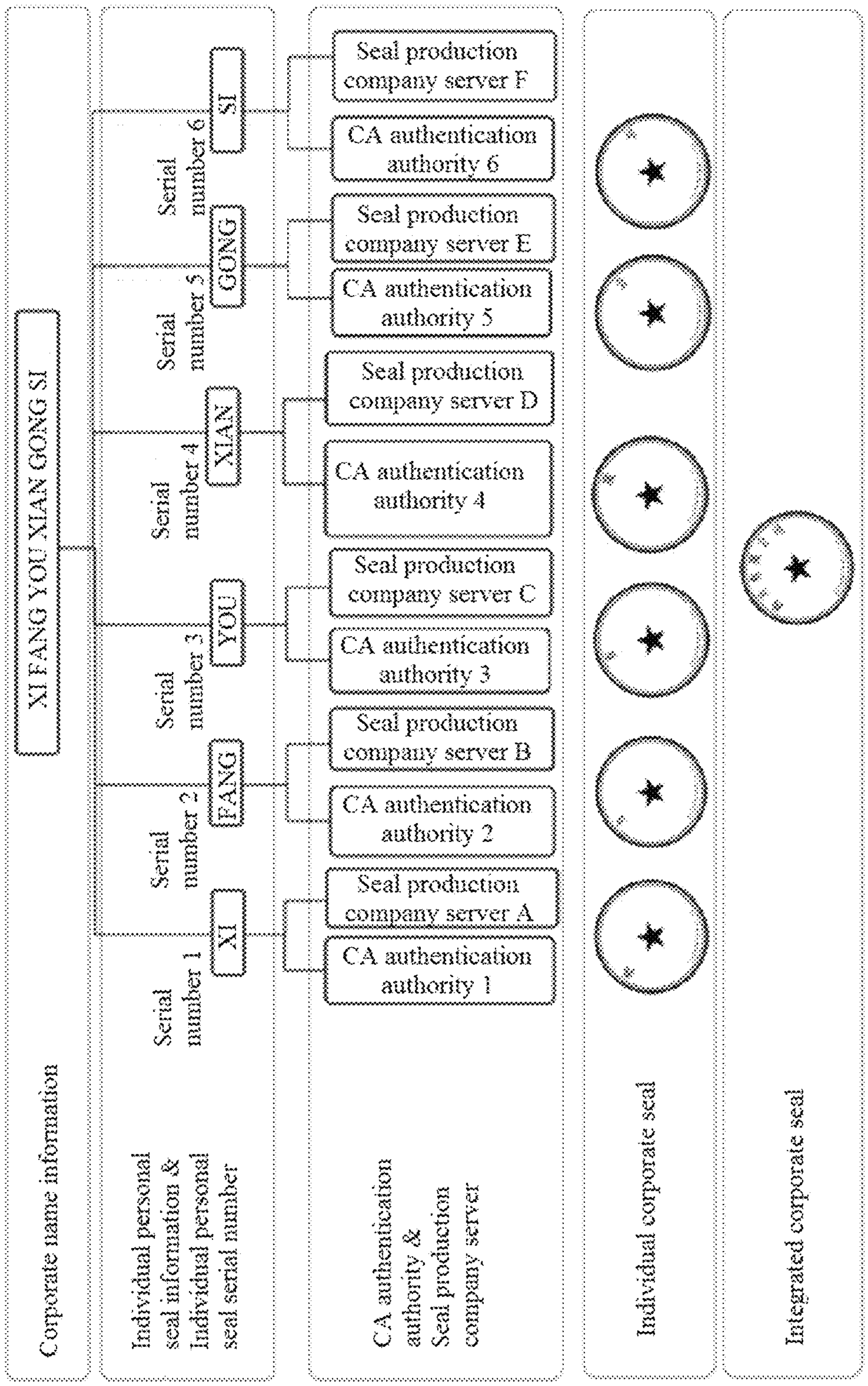
FIG. 8 is a schematic diagram of an embodiment of generating multiple individual corporate seals and generating an integrated corporate seal according to the present invention.

With reference to FIG. 4 to FIG. 8, FIG. 4 to FIG. 7 are schematic diagrams of embodiments of generating multiple individual personal seals and generating an integrated personal seal according to the present invention, and FIG. 8 is a schematic diagram of an embodiment of generating multiple individual corporate seals and generating an integrated corporate seal according to the present invention.

Figure 4:
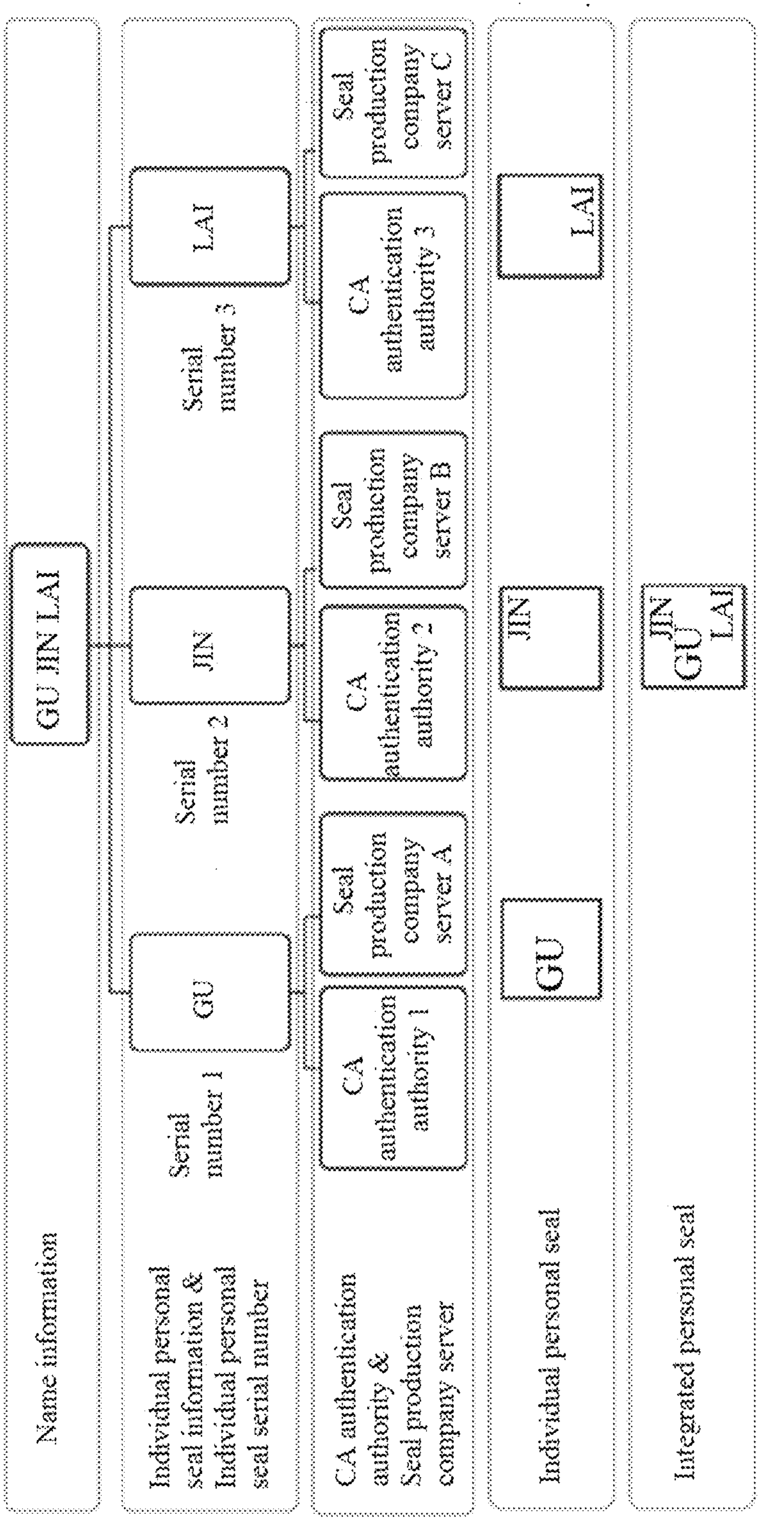
FIG. 4 is a schematic diagram of an embodiment of generating multiple individual personal seals and generating an integrated personal seal according to the present invention.

As shown in FIG. 4, a user inputs name information "GU JIN LAI", at the moment, the second information acquisition module 120 will split the name information "GU JIN LAI" and generate multiple individual personal seal information of "GU", "JIN", "LAI" and multiple corresponding individual personal seal serial numbers, in which the individual personal seal information "GU" corresponds to a serial number "1", the individual personal seal information "JIN" corresponds to an individual personal seal serial number "2", and the individual personal seal information "LAI" corresponds to a serial number "3".

It is to be noted that the multiple individual personal seal information SPNI1-SPNIp is subjected to entity or digital authentication by adopting the CA certificates provided by different certificate issuing authorities. For example, in FIG. 4, the individual personal seal information of "GU", "JIN" and "LAI" is subjected to entity or digital authentication by adopting the CA certificates provided by a CA authentication authority 1, a CA authentication authority 2 and a CA authentication authority 3 respectively. It is also to be noted that the multiple individual personal seals SPNI1-SPNIp are generated by different seal production company servers respectively. For example, the individual personal seals of "GU", "JIN" and "LAI" are generated by a seal production company server A, a seal production company server B and a seal production company server C respectively. Then, in FIG. 4, the individual seal generation module 150 can generate the individual personal seals of "GU", "JIN" and "LAI". Then, the integrated seal generation module 160 will integrate and bind the individual personal seals of "GU", "JIN" and "LAI" with corresponding individual personal seal serial numbers "1", "2" and "3" respectively to generate the integrated personal seal of "GU JIN LAI" as shown in FIG. 4.

The example in FIG. 4 is only used for explaining the conception of the present invention and is not a limiting condition of the present invention. In other embodiments, the number of characters in the name information is not limited to three, and it may also be two, four or more. In addition, the language of the name information is not limited to simplified Chinese and traditional Chinese, and it may be English, French, German, Russian or other languages.

Figure 5:
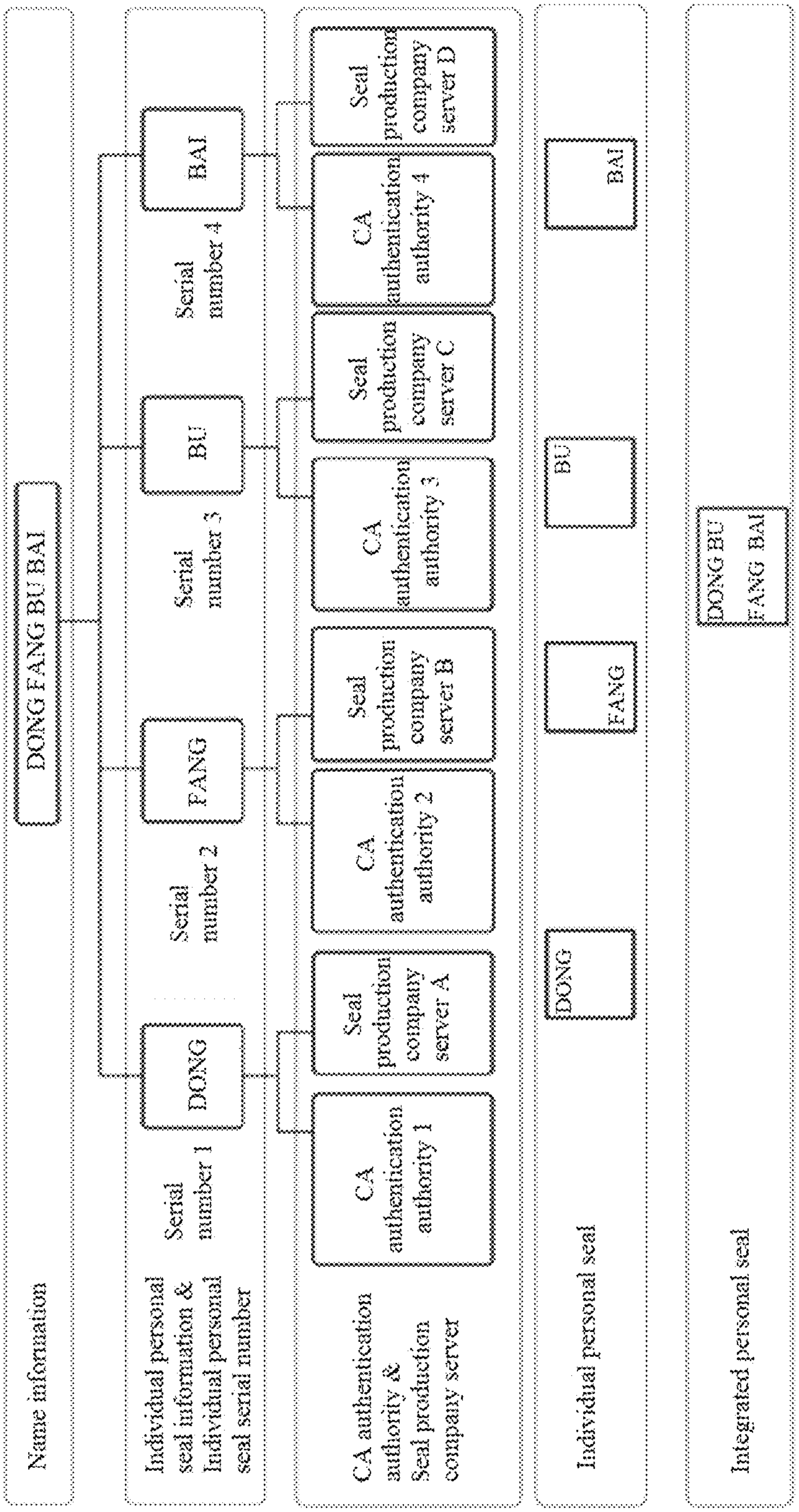
FIG. 5 is a schematic diagram of an embodiment of generating multiple individual personal seals and generating an integrated personal seal according to the present invention.

As shown in FIG. 5, a user inputs name information "DONG FANG BU BAI", at the moment, the second information acquisition module 120 will split the name information "DONG FANG BU BAI" and generate multiple individual personal seal information of "DONG", "FANG", "BU", "BAI" and multiple corresponding individual personal seal serial numbers, in which the individual personal seal information "DONG" corresponds to a serial number "1", the individual personal seal information "FANG" corresponds to a serial number "2", the individual personal seal information "BU" corresponds to a serial number "3", and the individual personal seal information "BAI" corresponds to a serial number "4".

It is to be noted that in FIG. 5, the individual personal seal information of "DONG", "FANG", "BU", "BAI" is subjected to entity or digital authentication by adopting the CA certificates provided by the CA authentication authority 1, the CA authentication authority 2, the CA authentication authority 3 and a CA authentication authority 4 respectively. It is also to be noted that individual personal seals of "DONG", "FANG", "BU" and "BAI" are generated by the seal production company server A, the seal production company server B, the seal production company server C and a seal production company server D respectively. Then, in FIG. 5, the individual seal generation module 150 can generate individual personal seals of "DONG", "FANG", "BU" and "BAI" respectively. Then, the integrated seal generation module 160 will integrate and bind the individual personal seals of "DONG", "FANG", "BU" and "BAI" with the corresponding individual personal seal serial numbers "1", "2", "3" and "4" respectively to generate an integrated personal seal of "DONG FANG BU BAI" as shown in FIG. 5.

As shown in FIG. 6, a user inputs name information "Tom Lin", and at the moment, the second information acquisition module 120 will split the name information "Tom Lin" and generate multiple individual personal seal information of "Tom" and "Lin" and multiple corresponding individual personal seal serial numbers, in which the individual personal seal information "Tom" corresponds to a serial number "1", and the individual personal seal information "Lin" corresponds to a serial number "2".

It is to be noted that in FIG. 6, the individual personal seal information of "Tom" and "Lin" is subjected to entity or digital authentication by adopting the CA certificates provided by the CA authentication authority 1 and the CA authentication authority 2 respectively. It is also to be noted that individual personal seals of "Tom" and "Lin" are generated by the seal production company server A and the seal production company server B respectively. Then, in FIG. 6, the individual seal generation module 150 can generate individual personal seals of "Tom" and "Lin" respectively. Then, the integrated seal generation module 160 will integrate and bind the individual personal seals of "Tom" and "Lin" with the corresponding individual personal seal serial numbers "1" and "2" respectively to generate an integrated personal seal of "Tom Lin" as shown in FIG. 6.

As shown in FIG. 7, a user inputs name information "GU JIN LAI", and at the moment, the language transformation module 180 will transform the individual personal seals of "GU", "JIN", and "LAI" from the first language to the second language and generate multiple translated individual personal seal information, namely "GU", "JIN" and "LAI", in which the translated individual personal seal information "GU" corresponds to a serial number "1", the translated individual personal seal information "JIN" corresponds to a serial number "2", and the translated individual personal seal information "LAI" corresponds to a serial number "3".

It is to be noted that in FIG. 7, the translated individual personal seal information of "GU", "JIN" and "LAI" is subjected to entity or digital authentication by adopting the CA certificates provided by the CA authentication authority 1 and the CA authentication authority 2 respectively. It is also to be noted that the translated individual personal seals of "GU", "JIN" and "LAI" are generated by the seal production company server A, the seal production company server B and the seal production company server C respectively. Then, in FIG. 7, the individual seal generation module 150 can generate translated individual personal seals of "GU", "JIN" and "LAI" respectively. Then, the integrated seal generation module 160 will integrate and bind the translated individual personal seals of "GU", "JIN" and "LAI" with corresponding individual personal seal serial numbers "1", "2" and "3" respectively to generate an integrated personal seal "GU JIN LAI" as shown in FIG. 7.

As shown in FIG. 8, a user inputs corporate name information "XI FANG YOU XIAN GONG SI", at the moment, the second information acquisition module 120 will split the corporate name information "XI FANG YOU XIAN GONG SI" and generate multiple individual corporate seal information of "XI", "FANG", "YOU", "XIAN", "GONG", "SI" and multiple corresponding individual corporate seal serial numbers, in which the individual corporate seal information "XI" corresponds to a serial number "1", the individual corporate seal information "FANG" corresponds to a serial number "2", the individual corporate seal information "YOU" corresponds to a serial number "3", the individual corporate seal information "XIAN" corresponds to a serial number "4", the individual corporate seal information "GONG" corresponds to a serial number "5", and the individual corporate seal information "SI" corresponds to a serial number "6".

It is to be noted that in FIG. 8, the individual corporate seal information of "XI", "FANG", "YOU", "XIAN", "GONG" and "SI" is subjected to entity or digital authentication by adopting the CA certificates provided by the CA authentication authority 1, the CA authentication authority 2, the CA authentication authority 3, the CA authentication authority 4, a CA authentication authority 5 and a CA authentication authority 6 respectively. It is also to be noted that the individual corporate seals of "XI", "FANG", "YOU", "XIAN", "GONG" and "SI" are generated by the seal production company server A, the seal production company server B, the seal production company server C, the seal production company server D, a seal production company server E and a seal production company server F respectively. Then, in FIG. 8, the individual seal generation module 150 can generate individual corporate seals of "XI", "FANG", "YOU", "XIAN", "GONG" and "SI" respectively. Then, the integrated seal generation module 160 will integrate and bind the individual corporate seals of "XI", "FANG", "YOU", "XIAN", "GONG" and "SI" with corresponding individual corporate seal serial numbers "1", "2", "3", "4", "5" and "6" respectively to generate an integrated corporate seal of "XI FANG YOU XIAN GONG SI" as shown in FIG. 8.

The multiple individual personal seals respectively correspond to one character in the name information instead of full names. For example, in FIG. 4, "GU JIN LAI" is the name information and includes three Chinese characters of the full names, and each of the individual personal seals "GU", "JIN" and "LAI" only includes one Chinese character in the name information; in FIG. 5, "DONG FANG BU BAI" is the name information and includes four Chinese characters of the full names, and each of the individual personal seals "DONG", "FANG", "BU" and "BAI" only includes one Chinese character in the name information; in FIG. 6, "Tom Lin" is the name information and includes two English words of the full names, and each of the individual personal seals "Tom" and "Lin" only includes one English word in the name information; and in FIG. 7, "GU JIN LAI" is the name information and includes three Chinese characters of the full names, three individual personal seals of "GU", "JIN" and "LAI" are generated firstly, and the three individual personal seals of "GU", "JIN" and "LAI" are transformed into English from Chinese (translated) to generate three translated individual personal seal information of "GU", "JIN" and "LAI", and each of the translated individual personal seals "GU", "JIN" and "LAI" only includes one English word in the translated name information. In a similar way, the multiple individual corporate seals respectively correspond to one character in corporate name information instead of full names. For example, in FIG. 8, "XI FANG YOU XIAN GONG SI" is the corporate name information and includes six Chinese characters of the full names of the corporate, and each of the individual corporate seal information of "XI", "FANG", "YOU", "FANG", "YOU", "XIAN", "GONG" and "SI" only includes one Chinese character in the corporate name information.

It is to be noted that each CA authentication authority can only authenticate one character in the full names of the name information or corporate name information, and therefore in FIG. 4, it needs three different CA authentication authorities to authenticate three individual personal seals of "GU", "JIN" and "LAI" respectively; in FIG. 5, it needs four different CA authentication authorities to authenticate four individual personal seals of "DONG", "FANG", "BU" and "BAI" respectively; in FIG. 6, it needs two different CA authentication authorities to authenticate two individual personal seals of "Tom" and "Lin" respectively; in FIG. 7, it needs three different CA authentication authorities to authenticate three translated individual personal seal information of "GU", "JIN" and "LAI" respectively; and in FIG. 8, it needs six different CA authentication authorities to authenticate six individual corporate seal information of "XI", "FANG", "YOU", "XIAN", "GONG" and "SI" respectively.

It is also to be noted that each seal production company server can only sign one character in the full names of the name information or corporate name information and generate a corresponding individual personal seal or individual corporate seal, therefore, in FIG. 4, it needs three different seal production company servers to sign three individual personal seal information of "GU", "JIN" and "LAI" respectively and generate three corresponding individual personal seals of "GU", "JIN" and "LAI"; in FIG. 5, it needs four different seal production company servers to sign four individual personal seal information of "DONG", "FANG", "BU" and "BAI" respectively and generate four corresponding individual personal seals of "DONG", "FANG", "BU" and "BAI"; in FIG. 6, it needs two different seal production company servers to sign two individual personal seal information of "Tom" and "Lin" respectively and generate four corresponding individual personal seals of "Tom" and "Lin"; and in FIG. 6, it needs six different seal production company servers to sign six individual corporate seal information of "XI", "FANG", "YOU", "XIAN", "GONG" and "SI" respectively and generate six corresponding individual corporate seals of "XI", "FANG", "YOU", "XIAN", "GONG" and "SI".

It is to be noted that the multiple individual personal seal information includes at least two or more individual personal seal information, and the multiple corresponding individual personal seal serial numbers are ascended according to an input sequence of the name information; and the multiple individual corporate seal information includes at least two or more individual corporate seal information, and the multiple corresponding individual corporate seal serial numbers are ascended according to the input sequence of the corporate seal information. For example, in FIG. 4, the input sequence of the individual personal seals of "GU", "JIN" and "LAI" is "GU", "JIN" and "LAI", and the corresponding individual personal seal serial numbers are also ascended according to the input sequence of the name information, that is, the serial number of "GU" is "1", the serial number of "JIN" is "2", and the serial number of "LAI" is "3". For another example, in FIG. 8, the input sequence of the individual corporate seals of "XI", "FANG", "YOU", "XIAN", "GONG" and "SI" is "XI", "FANG", "YOU", "XIAN", "GONG" and "SI", and the corresponding individual corporate seal serial numbers are also ascended according to the input sequence of corporate name information, that is, the serial number of "XI" is "1", the serial number of "FANG" is "2", the serial number of "YOU" is "3", the serial number of "XIAN" is "4", the serial number of "GONG" is "5", and the serial number of "SI" is "6".

In addition, the personal seals (including the individual personal seals and the integrated personal seal) can be combined with individual mobile email, for example, "GU JIN LAI" corresponds to China Mobile 139 Mail, the 139 Mail is activated firstly, and real name authentication can be performed through email application. At the moment, the email application is formatted, and the email serves as a digital application tool and can store different types of files in different forms, such as contracts, invoices, videos and photos. An email system is linked with a seal production platform and can be linked with the seal production company servers of multiple seal production signature companies. Direct signatures can be directly edited in the email, and the email serving as a globalized universal security tool is better, more safely and more conveniently to manage individual electronic personal seals and corporate electronic seals.

According to the present invention, the name information and corporate name information are split into multiple individual personal seal information and multiple individual corporate seal information, the CA certificates provided by different certificate issuing authorities are adopted for entity or digital authentication, and each individual personal seal and each individual corporate personal seal are generated by different seal production company servers. Therefore, the security can be greatly improved through multi-element and multi-platform verification in the present invention. It is safe, convenient and more reliable for the user.

Figure 9:
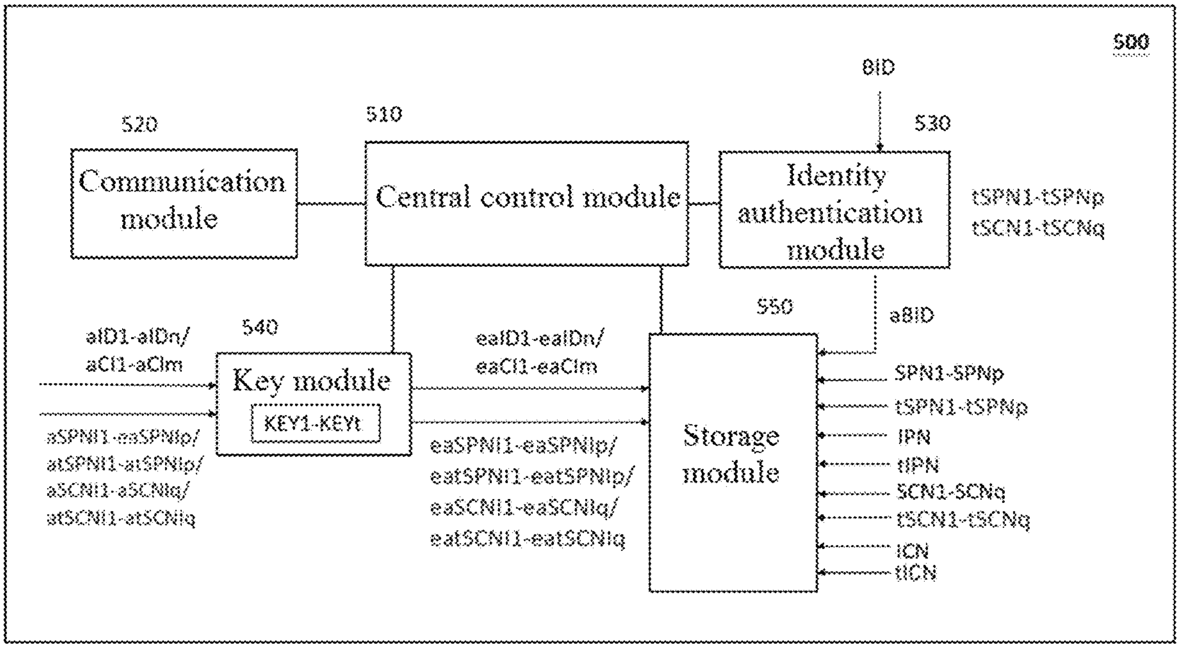
FIG. 9 is a framework diagram of a multi-module in FIG. 1, FIG. 2, and FIG. 3.

With reference to FIG. 1, FIG. 2, FIG. 3 and FIG. 9. As shown in FIG. 1, FIG. 2 and FIG. 3, the individual seal management terminal device 10A/10B/10C further includes a multi-module which 500 which is coupled to the individual seal generation module 150 and the authorization module 170. As shown in FIG. 9, the multi-module 500 includes a central control module 510, a communication module 520, an identity authentication module 530, a key module 540 and a storage module 550, in which the communication module 520, the identity authentication module 530, the key module 540 and the storage module 550 are connected to the central control module 510. The communication module 520 is configured to implement communication between the individual seal management terminal device 10A/10B/10C and an external server. The identity authentication module 530 is configured to authenticate biometric data BID inputted by the user to generate authenticated biometric data aBID and authorize the user after authentication. The key module 540 is configured to store the multiple keys KEY1-KEYt, and encrypt the multiple authenticated identity information aID1-aIDn, the multiple authenticated corporate information aCI1-aCIm, the multiple authenticated individual personal seal information aSPNI1-aSPNIp, the multiple authenticated translated individual personal seal information atSPNI1-atSPNIp, the multiple authenticated individual corporate seal information aSCNI1-aSCNIq and the multiple authenticated translated individual corporate seal information atSCNI1-atSCNIq according to the corresponding keys in the multiple keys KEY1-KEYt, so as to generate multiple encrypted authenticated identity information eaID1-eaIDn, multiple encrypted authenticated corporate information eaCI1-eaCIm, multiple encrypted authenticated individual personal seal information eaSPNI1-eaSPNIp, multiple encrypted authenticated translated individual personal seal information eatSPNI1-eatSPNIp, multiple encrypted authenticated individual corporate seal information eaSCNI1-eaSCNIq and multiple encrypted authenticated translated individual corporate seal information eatSCNI1-eatSCNIq. The storage module 550 is configured to store the authenticated biometric data aBID, the multiple encrypted authenticated identity information eaID1-eaIDn, the multiple encrypted authenticated corporate information eaCI1-eaCIm, the multiple encrypted authenticated individual personal seal information eaSPNI1-eaSPNIp, the multiple encrypted authenticated translated individual personal seal information eatSPNI1-eatSPNIp, the multiple encrypted authenticated individual corporate seal information eaSCNI1-eaSCNIq, the multiple encrypted authenticated translated individual corporate seal information eatSCNI1-eatSCNIq, the multiple individual personal seals SPN1-SPNp, the multiple translated individual personal seals tSPN1-tSPNp, the integrated personal seal IPN, the translated integrated personal seal tIPN, the multiple individual corporate seals SCN1-SCNq, the multiple translated individual personal seals tSPN1-tSPNp, the integrated corporate seal ICN, and the translated integrated corporate seal tICN. The central control module 510 is configured to receive input and control operation of other modules 520-550, and allow the user to call the integrated personal seal IPN, the translated integrated personal seal tIPN, the integrated corporate seal ICN and/or the translated integrated corporate seal tICN after authorization.

Further, the communication module 520 can include: at least one of a 3G communication module, a 4G communication module, a 5G communication module, a WIFI module, an NBIoT module, a Bluetooth module, an NFC module and an infrared module; and the communication module 520 supports IPV4 and IPV6 protocols.

It is also to be noted that the biometric data can include fingerprint information data, palm print information data, iris information data and/or facial feature identification data, or any biological feature data capable of identifying the user. In practical application, one or a combination of more of the above data can be adopted for security identification.

The individual seal management terminal device according to the present invention can be a trusted authentication server system or a third-party authentication platform system, and the system includes authentication, storage, management and application of various certificate keys such as an electronic seal, and it corresponds to any department or platform system of social and economic transactions, including government, corporates, individuals and families.

The individual seal management terminal device according to the present invention can be implemented by a chip of a material and electricity integrated intelligent electronic seal, the chip of the material and electricity integrated intelligent electronic seal stores various certificates and keys, and all the certificates and keys can be remotely distributed, downloaded, stored and applied.

Figure 10:
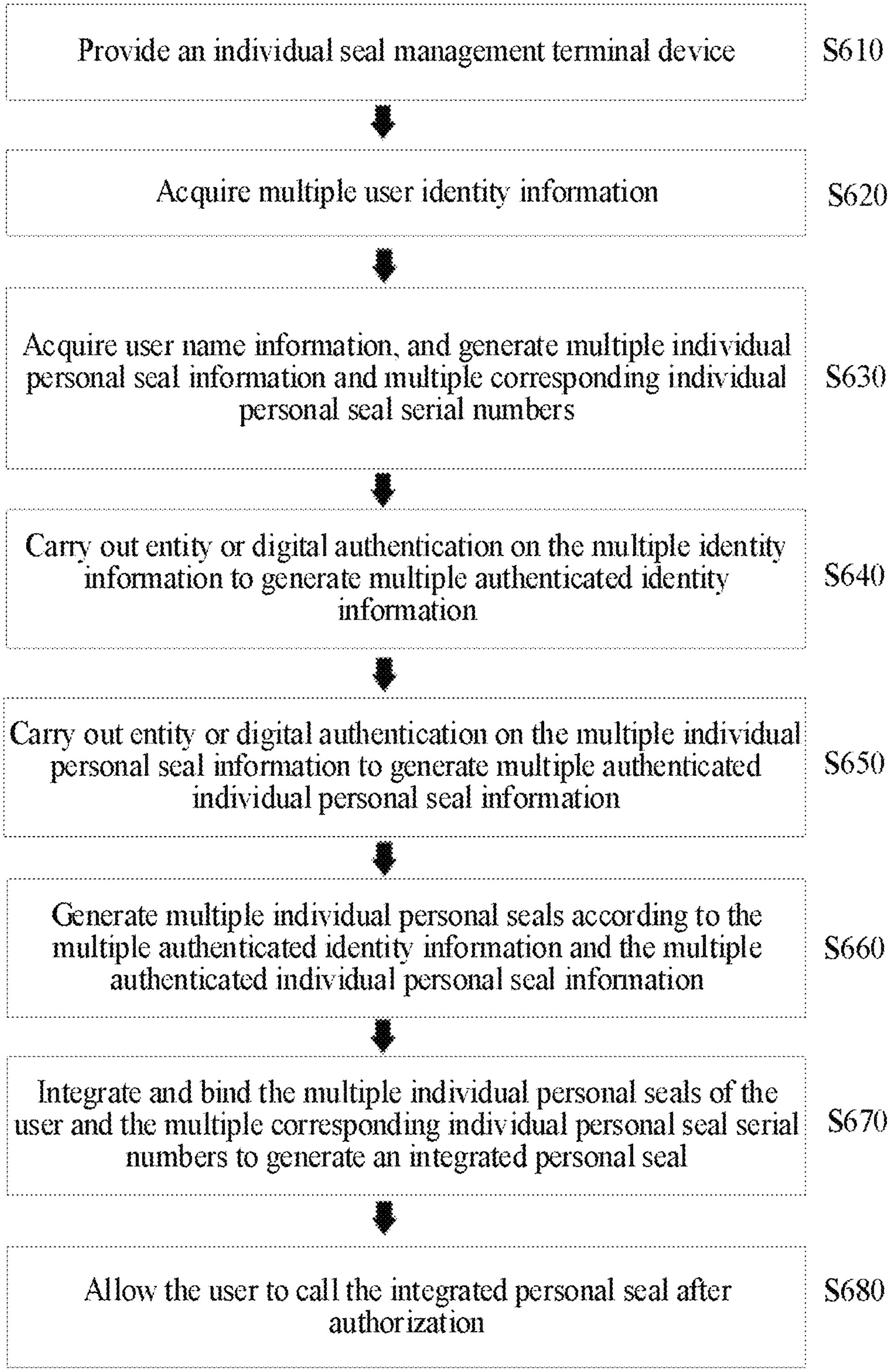
FIG. 10 is a flowchart of an individual seal management method in an Embodiment 1 of the present invention.

With reference to FIG. 1 and FIG. 10, FIG. 10 is a flowchart of an individual seal management method in an Embodiment 1 of the present invention. The individual seal management method in FIG. 10 includes the following steps:

- step S610: providing an individual seal management terminal device, in which the individual seal management terminal device includes a first information acquisition module, a second information acquisition module, a first authentication module, a second authentication module, an individual seal generation module, an integrated seal generation module, and an authorization module;
- step S620: acquiring multiple user identity information through the first information acquisition module;
- step S630: acquiring user name information through the second information acquisition module, and generating multiple individual personal seal information and multiple corresponding individual personal seal serial numbers;
- step S640: carrying out entity or digital authentication on the multiple identity information through the first authentication module to generate multiple authenticated identity information;
- step S650: carrying out entity or digital authentication on the multiple individual personal seal information through the second authentication module to generate multiple authenticated individual personal seal information;
- step S660: generating multiple individual personal seals through the individual seal generation module according to the multiple authenticated identity information and the multiple authenticated individual personal seal information;
- step S670: integrating and binding the multiple individual personal seals of the user and the multiple corresponding individual personal seal serial numbers through the integrated seal generation module to generate an integrated personal seal; and
- step S680: allowing the user to call the integrated personal seal after authorization through the authorization module.

It is to be noted that step S620 is performed through the first information acquisition module 110; step S630 is performed through the second information acquisition module 120; step S640 is performed through the first authentication module 130; step S650 is performed through the second authentication module 140; step S660 is performed through the individual seal generation module 150; step S670 is performed through the integrated seal generation module 160; and step S680 is performed through authorization module 170.

Figure 11:
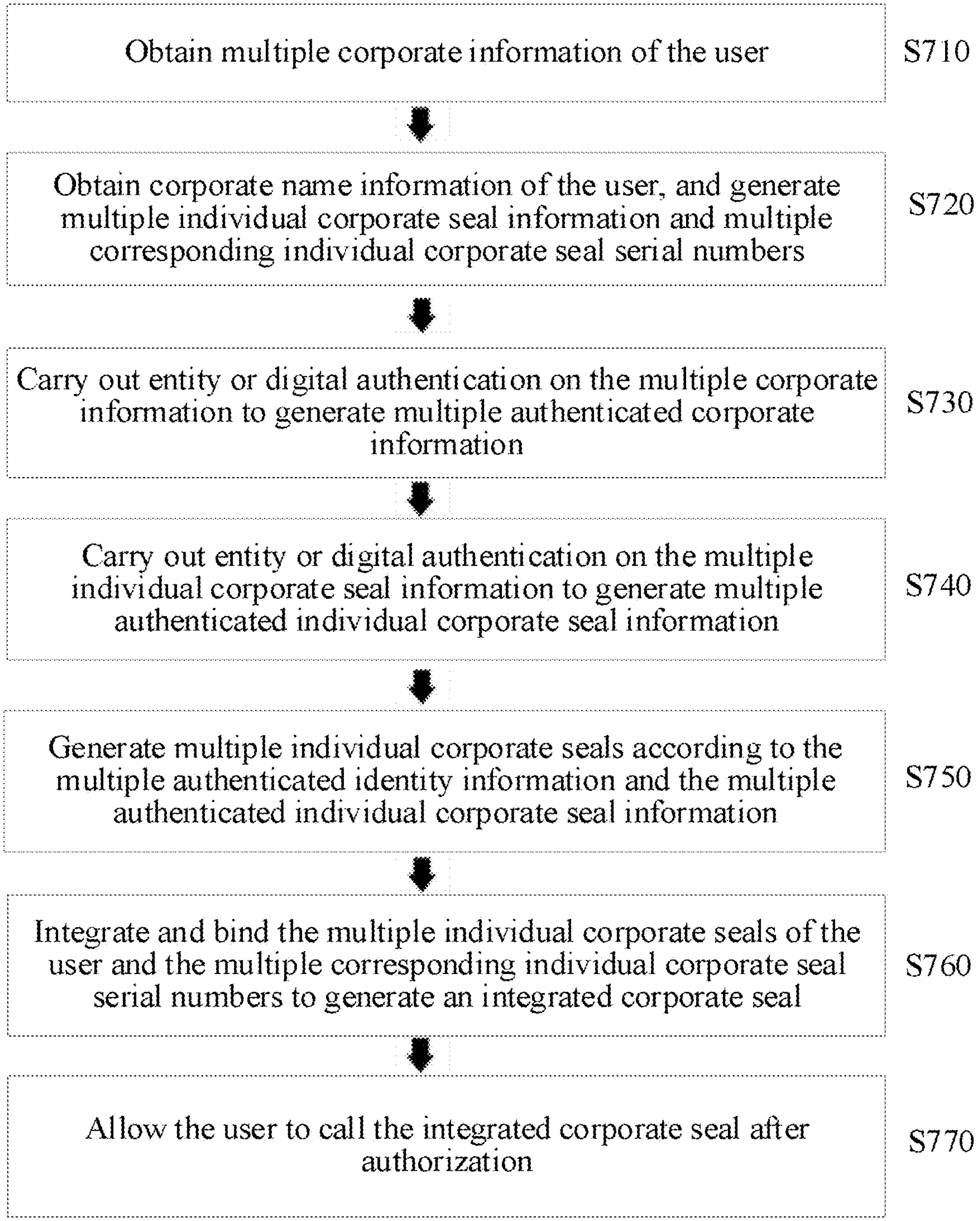
FIG. 11 is a flowchart of an individual seal management method in an Embodiment 2 of the present invention.

With reference to FIG. 2 and FIG. 11, FIG. 11 is a flowchart of an individual seal management method in an Embodiment 2 of the present invention. Except the steps in FIG. 10, the individual seal management method according to the present invention further includes the following steps:

- step S710: obtaining multiple corporate information of the user through the first information acquisition module;
- step S720: obtaining corporate name information of the user through the second information acquisition module, and generating multiple individual corporate seal information and multiple corresponding individual corporate seal serial numbers;

step S730: carrying out entity or digital authentication on the multiple corporate information through the first authentication module to generate multiple authenticated corporate information;

step S740: carrying out entity or digital authentication on the multiple individual corporate seal information through the second authentication module to generate multiple authenticated individual corporate seal information;

step S750: generating multiple individual corporate seals according to the multiple authenticated identity information and the multiple authenticated individual corporate seal information through the individual seal generation module;

step S760: integrating and binding the multiple individual corporate seals of the user and the multiple corresponding individual corporate seal serial numbers through the integrated seal generation module so as to generate an integrated corporate seal; and step S770: allowing the user to call the integrated corporate seal after authorization through the authorization module.

Figure 12:
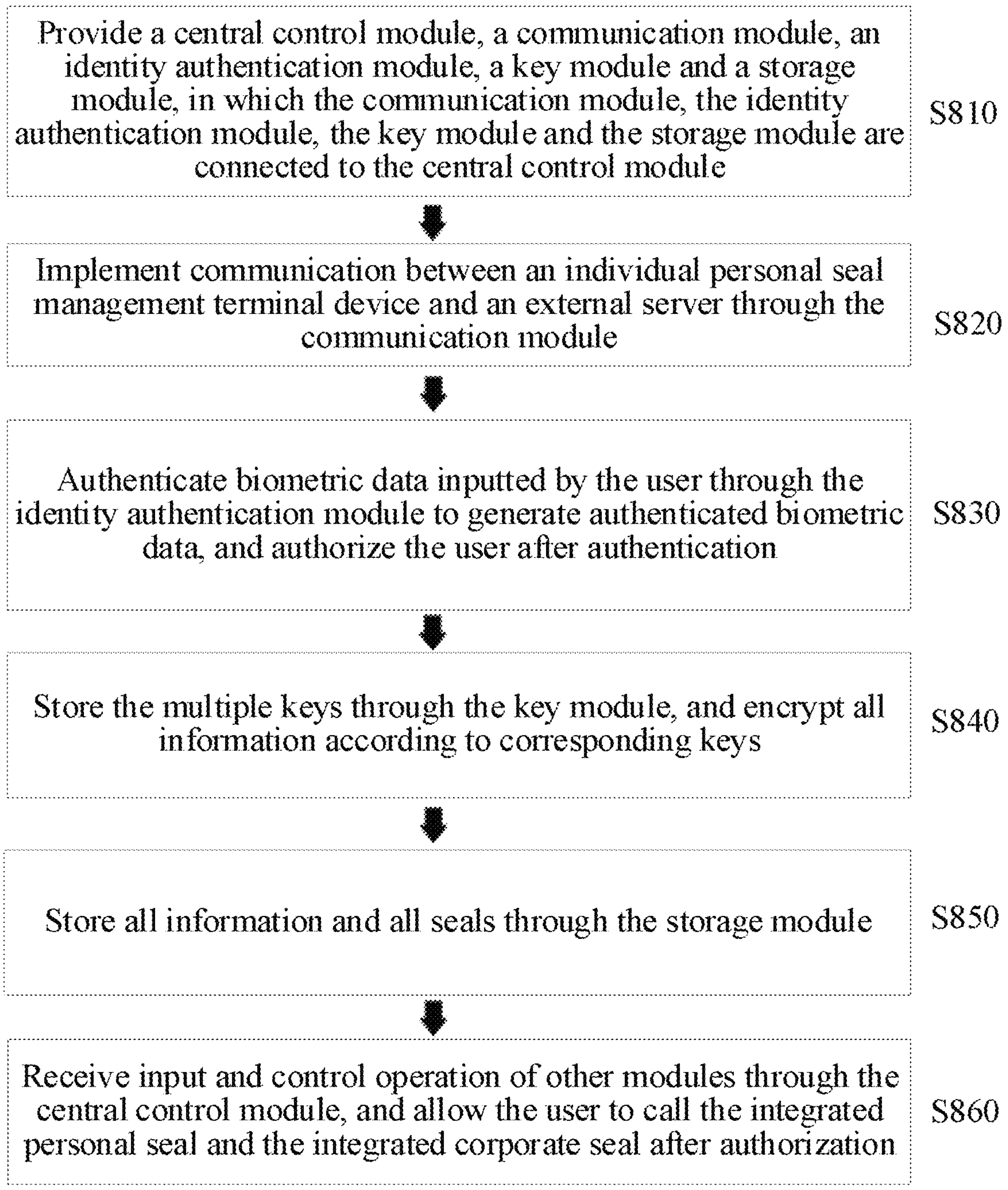
FIG. 12 is a flowchart of an individual seal management method in an Embodiment 3 of the present invention.

With reference to FIG. 9 and FIG. 12, FIG. 12 is a flowchart of an individual seal management method in an Embodiment 3 of the present invention. Except the steps in FIG. 10 and FIG. 11, the individual seal management method according to the present invention further includes the following steps:

step S810: providing a central control module, a communication module, an identity authentication module, a key module and a storage module, in which the communication module, the identity authentication module, the key module and the storage module are connected to the central control module;

step S820: implementing communication between the individual seal management terminal device and an external server through the communication module;

step S830: authenticating biometric data inputted by the user through the identity authentication module to generate authenticated biometric data and authorizing the user after authentication;

step S840: storing the multiple keys through the key module, and encrypting the multiple authenticated identity information, the multiple authenticated corporate information, the multiple authenticated individual personal seal information and the multiple authenticated individual corporate seal information according to the corresponding keys in the multiple keys, so as to generate multiple encrypted authenticated identity information, multiple encrypted authenticated corporate information, multiple encrypted authenticated individual personal seal information and multiple encrypted authenticated individual corporate seal information;

step S850: storing the authenticated biometric data, the multiple encrypted authenticated identity information, the multiple encrypted authenticated corporate information, the multiple encrypted authenticated individual personal seal information, the multiple encrypted authenticated individual corporate seal information, the multiple individual personal seals, the integrated personal seal, the multiple individual corporate seals and the integrated corporate seal through the storage module; and step S860: receiving input and controlling operation of other modules through the central control module, and allowing the user to call the integrated personal seal and the integrated corporate seal after authorization.

It is to be noted that step S820 is performed through the communication module 520; step S830 is performed through the identity authentication module 530; step S840 is performed through the key module 540; step S850 is performed through the storage module 550; and step S860 is performed through the central control module 510.

The specific embodiments of the present invention provide an individual seal unified management and unified handling system and an individual seal unified management and unified handling method; the name information and corporate name information are split into multiple individual personal seal information and multiple individual corporate seal information, and entity or digital authentication is performed by adopting the CA certificates provided by different certificate issuing authorities respectively; each individual personal seal and each individual corporate seal are generated by different seal production company servers respectively. Therefore, the security can be greatly improved through multi-element and multi-platform verification in the present invention. It is safe, convenient and more reliable for the user.

The embodiments of the present invention can be implemented in various hardware, software codes or a combination thereof. For example, the embodiment of the present invention can also be that the program cods of the above method is executed in a Digital Signal Processor (DSP). The present invention may also relate to various functions executed by a computer processor, the DSP, a microprocessor or a Field Programmable Gate Array (FPGA). The processor can be configured according to the present invention to execute a specific task, which can be implemented by executing a machine-readable software code or a firmware code defining the specific method disclosed by the present invention. The software code or the firmware code can be developed into different program languages and different formats or forms. The software code can also be compiled for different target platforms. However, different code styles, types and languages of the software code that performs the task according to the present invention and other types of configuration codes do not deviate from the spirit and scope of the present invention.

By means of the above technical solutions, the present invention has the following beneficial effects: compared with the prior art, according to the individual seal management terminal device and the individual seal management method provided by the present invention, the name information is split into the multiple individual personal seal information, the CA certificates provided by different certificate issuing authorities are adopted for entity or digital authentication, and each individual personal seal is generated by different seal production company servers; the present invention can be further applied to corporate name information, the corporate name information is split into the multiple individual corporate seal information, the CA certificates provided by different certificate issuing authorities are adopted for entity or digital authentication, and each individual corporate seal is generated by different seal production company servers. In addition, according to the present invention, the name information and the corporate name information can be simplified Chinese, traditional Chinese, English, French, German, Russian or other languages, and Chinese can be transformed into English, French, German, Russian or other languages through a translation platform, and vice versa. Thus, the security can be greatly improved through multi-element and multi-platform verification according to the present invention.

In general, the individual seal management terminal device and the individual seal management method provided by the present invention have the following characteristics and beneficial effects:

1, each character in the name information and corporate name information is subjected to separate authentication and separate signing;

2, each character in the name information and the corporate name information is subjected to authentication authorization, cloud signing and common signing and management on different platforms;

3, Chinese names, English names, French names, German names, Russian names or other language names all can be subjected to authorization authentication in all countries with CA authentication authorities in the world;

4, The personal seal is bound with email, the email needs to be activated, a linked email platform is searched for in the email, and the email platform corresponds to an electronic seal system all over the world, so the security is high; and 5, different types of files in different forms can be stored by the formatted email, such as contracts, invoices, videos, photos and other types.

In the present invention, the principle and embodiment of the present invention have been elaborated by applying specific embodiments, and the description of the above embodiments is only used for helping understand the method of the present invention and its core idea; moreover, for those skilled in the art, according to the idea of the present invention, there will be changes in the specific embodiment and the scope of application, and in summary, the contents of the specification should not be understood as a restriction on the present invention.

The invention claimed is:

1. An individual seal management method, applying to an individual seal management terminal device, and comprising the following steps:

providing the individual seal management terminal device, wherein the individual seal management terminal device comprises a first information acquisition module, a second information acquisition module, a first authentication module, a second authentication module, an individual seal generation module, an integrated seal generation module, and an authorization module;

acquiring multiple user identity information through the first information acquisition module;

acquiring user name information through the second information acquisition module, and splitting the user name information to generate multiple individual personal seal information and multiple corresponding individual personal seal serial numbers, each of the multiple individual personal seal information and the multiple corresponding individual personal seal serial numbers corresponding to one character or one word in the user name information;

connecting multiple first certificate issuing authorities through the first authentication module to obtain multiple first certificate authority (CA) certificates provided by the multiple first certificate issuing authorities and multiple corresponding first keys according to the multiple first CA certificates, and carrying out entity or digital authentication on the multiple user identity information according to the multiple first CA certificates through the first authentication module to generate multiple authenticated identity information;

connecting multiple second certificate issuing authorities through the second authentication module to obtain multiple second CA certificates provided by the multiple second certificate issuing authorities and multiple corresponding second keys, and carrying out entity or digital authentication on the multiple individual personal seal information according to the multiple second CA certificates through the second authentication module to generate multiple authenticated individual personal seal information;

generating multiple individual personal seals through the individual seal generation module according to the multiple authenticated identity information and the multiple authenticated individual personal seal information;

integrating and binding the multiple individual personal seals of the user and the multiple corresponding individual personal seal serial numbers through the integrated seal generation module to generate an integrated personal seal; and allowing the user to call the integrated personal seal after authorization through the authorization module.

2. The individual seal management method according to claim 1, further comprising the following steps:

obtaining multiple corporate information of the user through the first information acquisition module;

obtaining corporate name information of the user through the second information acquisition module, and generating multiple individual corporate seal information and multiple corresponding individual corporate seal serial numbers;

carrying out entity or digital authentication on the multiple corporate information through the first authentication module to generate multiple authenticated corporate information;

carrying out entity or digital authentication on the multiple individual corporate seal information through the second authentication module to generate multiple authenticated individual corporate seal information;

generating multiple individual corporate seals according to the multiple authenticated identity information and the multiple authenticated individual corporate seal information through the individual seal generation module;

integrating and binding the multiple individual corporate seals of the user and the multiple corresponding individual corporate seal serial numbers through the integrated seal generation module to generate an integrated corporate seal; and allowing the user to call the integrated corporate seal after authorization through the authorization module.

3. The individual seal management method according to claim 2, further comprising the following steps:

transforming the multiple individual personal seal information and/or the multiple individual corporate seal information from a first language to a second language through a language transformation module, and generating multiple translated individual personal seal information and/or multiple translated individual corporate seal information;

carrying out entity or digital authentication on the multiple translated individual personal seal information and/or the multiple translated individual corporate seal information through the second authentication module to generate multiple authenticated translated individual personal seal information and/or multiple authenticated translated individual corporate seal information;

generating multiple translated individual personal seals according to the multiple authenticated identity information and the multiple authenticated translated individual personal seal information through the individual seal generation module, and generating multiple translated individual corporate seals according to the multiple authenticated identity information and the multiple authenticated translated individual corporate seal information; and integrating and binding the multiple translated individual personal seals of the user and the multiple corresponding individual personal seal serial numbers through the integrated seal generation module to generate a translated integrated individual personal seal, and integrating and binding the multiple translated individual corporate seals of the user and the multiple corresponding individual corporate seal serial numbers to generate a translated integrated corporate seal.

4. The individual seal management method according to claim 2, further comprising the following steps:

connecting multiple seal production company servers through the individual seal generation module, and generating the multiple individual personal seals and/or the multiple individual corporate seals through the multiple seal production company servers; and connecting the multiple seal production company servers through the integrated seal generation module, integrating and binding the multiple individual personal seals of the user with the multiple corresponding individual personal seal serial numbers through the multiple seal production company servers to generate the integrated personal seal, and integrating and binding the multiple individual corporate seals of the user with the multiple corresponding individual corporate seal serial numbers through the multiple seal production company servers so as to generate the integrated corporate seal.

5. The individual seal management method according to claim 2, further comprising the following steps:

carrying out entity or digital authentication on the multiple corporate information according to the multiple first CA certificates, so as to generate the multiple authenticated corporate information; and carrying out entity or digital authentication on the multiple individual corporate seal information according to the multiple second CA certificates, so as to generate the multiple authenticated individual corporate seal information.

6. The individual seal management method according to claim 4, wherein the multiple individual personal seals are generated by different seal production company servers respectively; and the multiple individual corporate seals are generated by different seal production company servers respectively.

7. The individual seal management method according to claim 5, wherein the multiple individual personal seal information is subjected to entity or digital authentication by adopting the second CA certificates provided by different second certificate issuing authorities respectively; and the multiple individual corporate seal information is subjected to entity or digital authentication by adopting the second CA certificates provided by different second certificate issuing authorities respectively.

8. The individual seal management method according to claim 5, further comprising the following steps:

providing a central control module, a communication module, an identity authentication module, a key module and a storage module, wherein the communication module, the identity authentication module, the key module and the storage module are connected to the central control module;

implementing communication between the individual seal management terminal device and an external server through the communication module;

authenticating biometric data inputted by the user through the identity authentication module to generate authenticated biometric data and authorizing the user after authentication;

storing the multiple keys through the key module, and encrypting the multiple authenticated identity information, the multiple authenticated corporate information, the multiple authenticated individual personal seal information and the multiple authenticated individual corporate seal information according to the corresponding keys in the multiple keys, so as to generate multiple encrypted authenticated identity information, multiple encrypted authenticated corporate information, multiple encrypted authenticated individual personal seal information and multiple encrypted authenticated individual corporate seal information;

storing the authenticated biometric data, the multiple encrypted authenticated identity information, the multiple encrypted authenticated corporate information, the multiple encrypted authenticated individual personal seal information, the multiple encrypted authenticated individual corporate seal information, the multiple individual personal seals, the integrated personal seal, the multiple individual corporate seals and the integrated corporate seal through the storage module; and receiving input and controlling operation of other modules through the central control module, and allowing the user to call the integrated personal seal and the integrated corporate seal after authorization.

* * * * *